United States Patent
Klein et al.

[19]

[11] Patent Number: 5,806,293
[45] Date of Patent: Sep. 15, 1998

[54] MOWER AND/OR AERATING DEVICE

[75] Inventors: Laurent Klein, Spicheren, France; Wilfried Schomäker, Bad Zwischenahn; Thomas Pfisterer, St. Ingbert, both of Germany

[73] Assignee: Amazone Machines Agricoles S.A., Forbach, France

[21] Appl. No.: 692,815

[22] Filed: Jul. 30, 1996

Related U.S. Application Data

[60] Provisional application No. 60/005,963 Oct. 27, 1995.

[30] Foreign Application Priority Data

Sep. 22, 1995 [DE] Germany .......................... 195 35 362.5
Sep. 22, 1995 [DE] Germany .......................... 195 35 363.3

[51] Int. Cl.⁶ .................................................. A01D 34/43
[52] U.S. Cl. ................................. 56/249; 56/202; 56/504; 172/22; 172/28
[58] Field of Search ............................ 56/249, 504, 505, 56/294, 202; 172/21, 27, 28, 22

[56] References Cited

U.S. PATENT DOCUMENTS

| | | | |
|---|---|---|---|
| 2,653,701 | 9/1953 | Heth ......................................... | 198/217 |
| 2,947,129 | 8/1960 | Kowalik ..................................... | 56/1 |
| 2,999,346 | 9/1961 | Mathews .................................... | 56/505 |
| 3,641,754 | 2/1972 | Anstee ....................................... | 56/341 |
| 4,550,554 | 11/1985 | Lundahl et al. ......................... | 56/504 X |

FOREIGN PATENT DOCUMENTS

| | | |
|---|---|---|
| 0685148 | 12/1995 | European Pat. Off. . |
| 1270757 | 1/1962 | France . |
| 1439552 | 8/1966 | France . |
| 2514987 | 2/1985 | France . |
| 2627051 | 8/1989 | France . |
| 2092086 | 8/1981 | United Kingdom . |
| 4222214 | 1/1994 | United Kingdom . |

*Primary Examiner*—Terry Lee Melius
*Attorney, Agent, or Firm*—Horst M. Kasper

[57] ABSTRACT

A mower and/or aerating device (7) exhibits a mower drum and/or aerating drum (8) rotating around a horizontal axis running perpendicular to the mower and/or aerating device advance direction. The mower drum and/or aerating drum (8) feeds cut material and/or material removed from ground to a transverse transport worm (16) rotating around a rotation axis running parallel to the aerating drum (8). The transverse transport worm (16) is disposed in a transport trough (15). A longitudinal transport worm (17) adjoins in the middle region of the transverse transport worm (16) at an angle of 90° relative to an axis of the transverse transport worm (16). A transfer element (21) is disposed at the transport trough (15), which transfer element (21) separates the mower drum and/or aerating drum (8) and the transverse transport worm (16). The transfer element (21) is disposed such that the material from the mower drum and/or aerating drum (8) is at least nearly completely thrown into the transport trough (15).

29 Claims, 7 Drawing Sheets

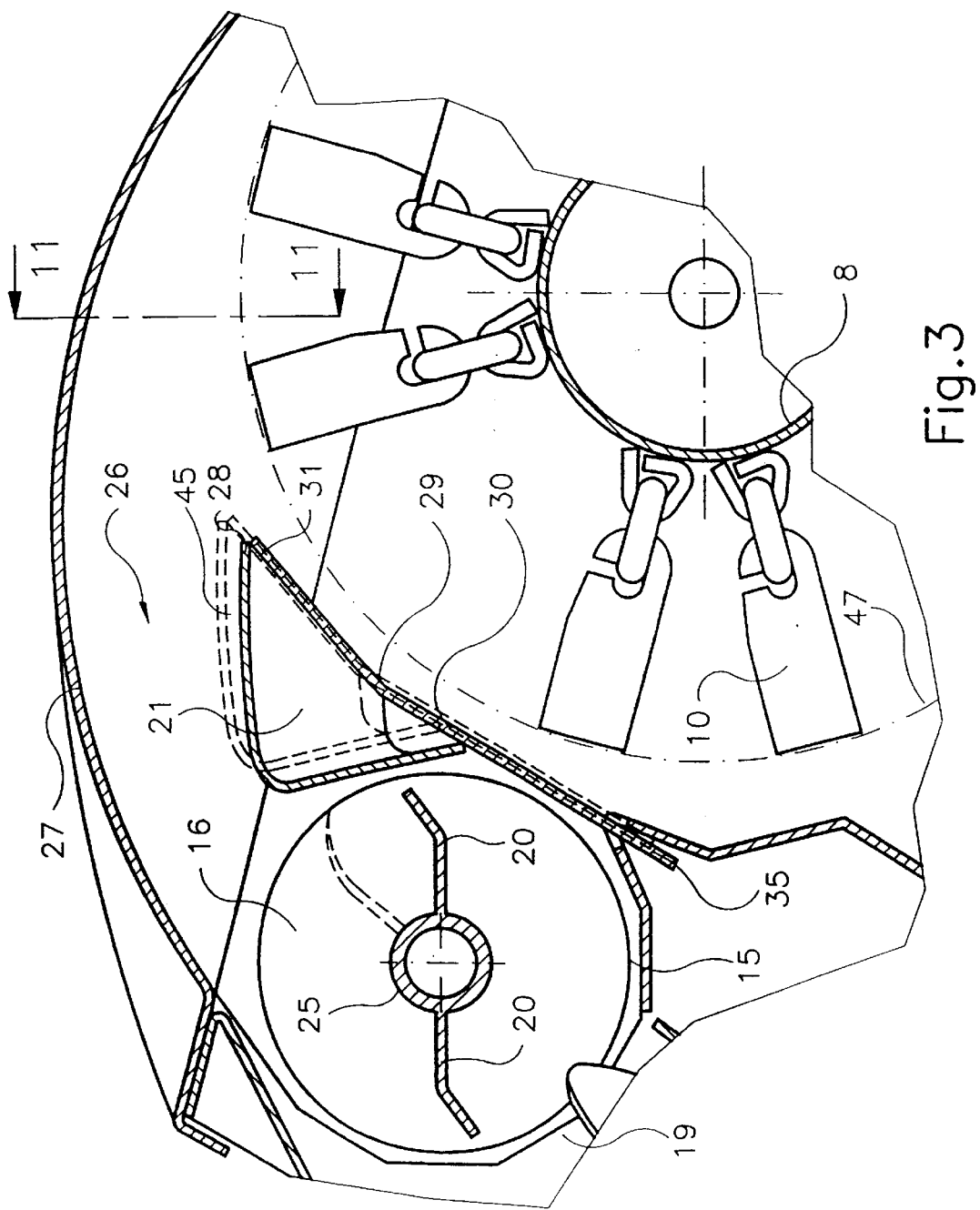

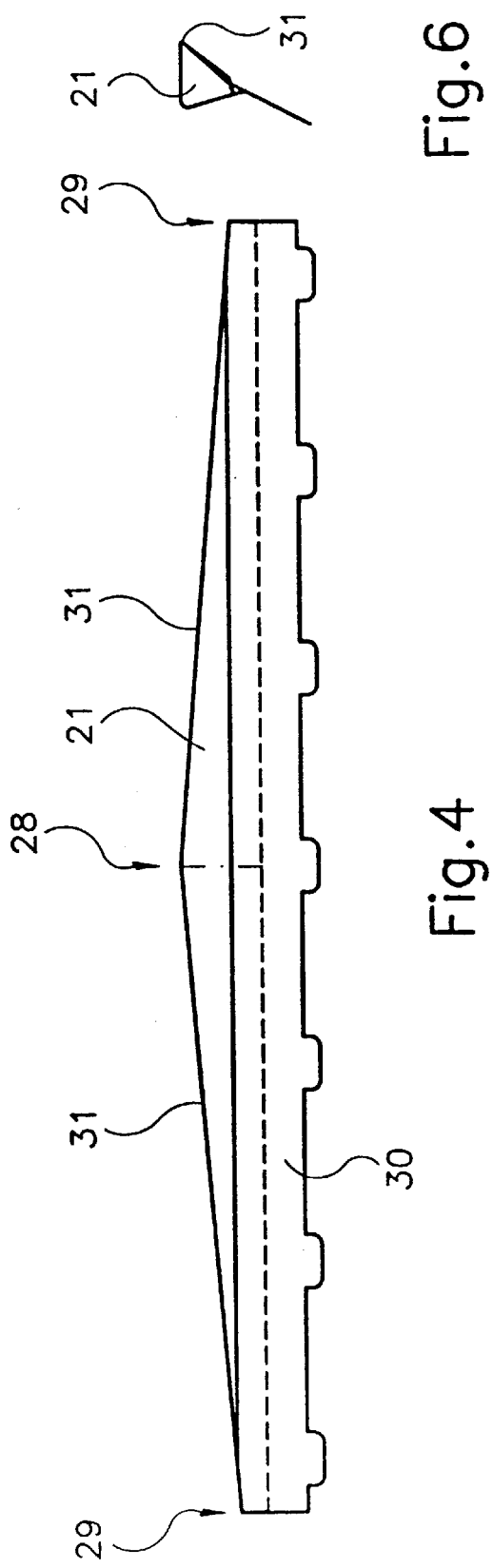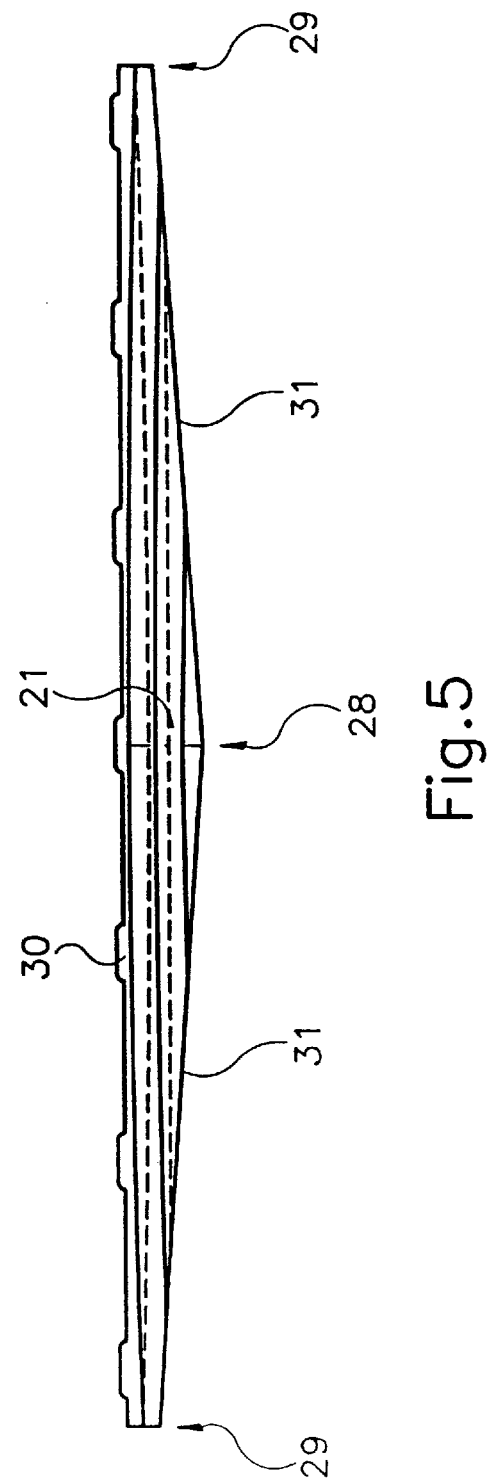

MOWER AND/OR AERATING DEVICE

CROSS-REFERENCE TO RELATED APPLICATIONS

This application refers to an earlier filed §111(b) provisional application filed Oct. 27, 1995 and bearing Ser. No. 60/005,963. The entire disclosure of this latter application, including the drawings thereof, is hereby incorporated in this application as if fully set forth herein.

BACKGROUND OF THE INVENTION

1. Field of the Invention

The invention relates to an aerating machine and/or a mower with a mower drum and/or an aerating drum disposed horizontally and perpendicular to the machine advance direction, wherein a rotating mower and/or rotating aerating drum are disposed horizontally and perpendicular to the vehicle advance direction, wherein the rotating mower and/or rotating aerating drum delivers the cut material and/or the material removed from the ground to a rotating transverse transport worm running parallel to the aerating drum and disposed in a transport trough.

2. Brief Description of the Background of the Invention Including Prior Art

Such a machine is known from the French patent 2,514,987. This machine exhibits a mower and/or aerating device. The mower and/or aerating device is coordinated to a transverse transport worm, where the transport worm delivers the materials to a longitudinal transport worm. The material is transported to a collection container with the longitudinal transport worm. The transverse transport worm is disposed in a transport trough. The material, mowed by the mower and/or fed by the aerating drum, is thrown by the respective drum onto the transport worm or, respectively, into the transport trough. Practical use has shown that the delivery of the material from the drum to the transverse worm or, respectively, to the transport trough is not satisfactory in particular in case of heavier or wet material and/or application situations.

SUMMARY OF THE INVENTION

1. Purposes of the Invention

It is an object of the present invention to achieve in a simple way a good and reliable transfer of the material to the transverse transport worm or, respectively, into the transverse transport trough.

It is a further object of the present invention to connect the mower drum and/or aerating drum and the transverse transport worm such as to generate a flow for achieving a nearly completely throwing of mowed material into the transverse transport worm.

It is another object of the present invention to provide an element to achieve a reliable transfer of the material from the transverse transport worm to the longitudinal transport worm.

These and other objects of and advantages of the present invention will become evident from the description which follows.

2. Brief Description of the Invention

These objects are achieved in accordance with the invention in that a transfer element or transfer plate is disposed at the transport trough separating the mower drum and/or aerating drum and the transverse transport worm, wherein the transfer element is disposed such that the material from the drum is nearly completely thrown into the transport trough. Based on this step, a sufficiently long separating path of the mowed material or the aerated material is achieved by the flow of air. Thus, the transfer of material delivered from the mower is substantially improved. The transfer element can be formed as a transfer plate or as a molded body.

It is furthermore provided that the transfer element exhibits in its center a larger width as compared to the width of the outer sides. This means that the transfer element is pulled down in the edge regions relative to the center. Thus, the collection quality in the outer side region is substantially improved relative to a transport trough exhibiting a horizontally running edge. Furthermore, the transverse transport worm can transport the material optimally into the center region since the transfer element exhibits the largest extension relative to the center of the mower and/or aerating device. The transfer element rises and is upwardly inclined toward the middle of the transverse extension of the mower and/or aerating device. Thus, the formation of the transport trough is adapted to the quantity of transported material of the transverse transport worm over the transport path distance of the transverse transport worm based on the shape of the transfer element. The transverse transport worm has to transport a larger volume in its center region as compared to the outer region. Since the transfer element exhibits at the transfer point from the transverse transport worm to the longitudinal transport worm a very broad widening, extending into the rotor space of the mower drum, there is achieved a sufficiently large separating path of the mowed material from the flow of air associated with the mowed material, in particular in case of mowed materials having a low density.

Furthermore, it is provided that the transfer plate extends in the direction of the mower drum and/or of the aerating drum and slopes upwards above the mower drum and/or aerating drum. Thus, there results an advantageous disposition of the transfer element.

In order to be able to adapt the functioning of the transfer element in an optimum fashion to the mowed material and/or aerated material in each case or, respectively, to the prevailing mowing conditions and/or aerating conditions, it is provided that the intermediate space between the upper part of the transfer element and the guide hood of the mower drum and/or aerating drum can be changed in that the position of the transfer element is adjustable by a sliding of the transfer element.

In order to assure a good transfer of the material from the transverse transport worm to the longitudinal transport worm, it is provided that the transverse transport worm exhibits in each case worm spirals or worm volutions, which are running in opposite directions and in each case from the outer ends to the center of the transverse transport worm, that the ends of the worm spirals are disposed staggered by 180° relative to each other in the center of the transverse transport worm, and that the delivery plates are disposed at the ends of the spirals of the transverse transport worm and running parallel to the rotation axis of the transverse transport worm. Based on these steps, it is accomplished with the delivery plates that the material, transported by the transverse transport worm to the longitudinal transport worm, is fed reliably and continuously to the longitudinal transport worm in the transfer region. A good transfer of the material from the transverse transport worm to the longitudinal transport worm is thereby achieved.

The delivery plates are disposed in the transfer region from the transverse transport worm to the longitudinal transport worm.

It has shown to be advantageous that the delivery plates exhibit a height level in the region of the spiral or volution which corresponds to the height level of the spiral and that the delivery plates are disposed sloping downwardly from this position starting at the upper edge of the spiral.

A mower and/or aerating device comprises a frame having a moving mechanism. A casing is attached to a front of the frame. A rotating drum is disposed in the casing and rotating around a horizontal axis. A transport trough is disposed in the casing and attached to the frame. A transverse transport worm rotates around a rotation axis running parallel to the rotating axis of the rotating drum and disposed in the transport trough. A transfer element is disposed at the transport trough for separating the rotating drum and the transverse transport worm. The transfer element is disposed such that the material cut and/or removed from the ground, delivered by the rotating drum, is thrown from the rotating drum at least approximately completely into the transport trough. A longitudinal transport worm follows the transverse transport worm and is disposed below a center region of the transverse transport worm with an angle of 90° between an axis of the longitudinal transport worm and an axis of the transverse transport worm.

The transfer element can be formed by a plate.

The transfer element can exhibit a larger width in a center region as compared to outer sides of the transfer element. The width can be measured along a mower and/or aerating device advance direction.

The transfer element can exhibit a largest height in a transfer region from the transverse transport worm to the longitudinal transport worm for the cut and/or from ground removed material.

The transfer element can extend in direction of the rotating drum and extend at an inclined angle upwardly above the rotating drum.

An upper guide hood can be disposed above the transverse transport worm and the rotating drum. An intermediate space between the transfer element and the upper guide hood can be adjusted by shifting the transfer element.

The transfer element can be made of a rectangular plate bent along a center axis of the rectangular plate at an angle of 90°. The rectangular plate can be attached to a front plate exhibiting at a free edge rectangular tongues matching guide rails furnished in the transport trough. The front plate can stabilize the transfer element.

The transverse transport worm can exhibit spirals running from outer sides of the transverse transport worm in opposite direction toward the center region of the transverse transport worm. Ends of the spirals disposed in the center region of the transverse transport worm can be staggered by 180° relative to each other. Each end of the spirals disposed in the center region can be attached to a delivery plate disposed in a plane containing the rotation axis of the transverse transport worm. Said delivery plates can be disposed in a transfer region of the cut and/or from ground removed material from the transverse transport worm to the longitudinal transport worm.

Each delivery plate can exhibit a height H in a region, where each said delivery plate is attached to said ends of the spirals disposed in the center region. The height H can correspond to a height H' of said spirals. Said each delivery plate can be disposed sloped downwardly at an angle from an upper edge of said spirals.

Said each delivery plate can be bent at a free edge running parallel to the axis of the transverse transport worm in a rotating direction of the transverse transport worm.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 3 is a cross-sectional view of a transverse transport worm with a transfer plate element and a mower drum at an enlarged scale;

FIG. 4 is a front elevational view of the transfer plate element;

FIG. 5 is a top planar view of the transfer plate element;

FIG. 6 is a side elevational view of the transfer plate element according to FIG. 4;

DESCRIPTION OF INVENTION AND PREFERRED EMBODIMENT

Figure 1:
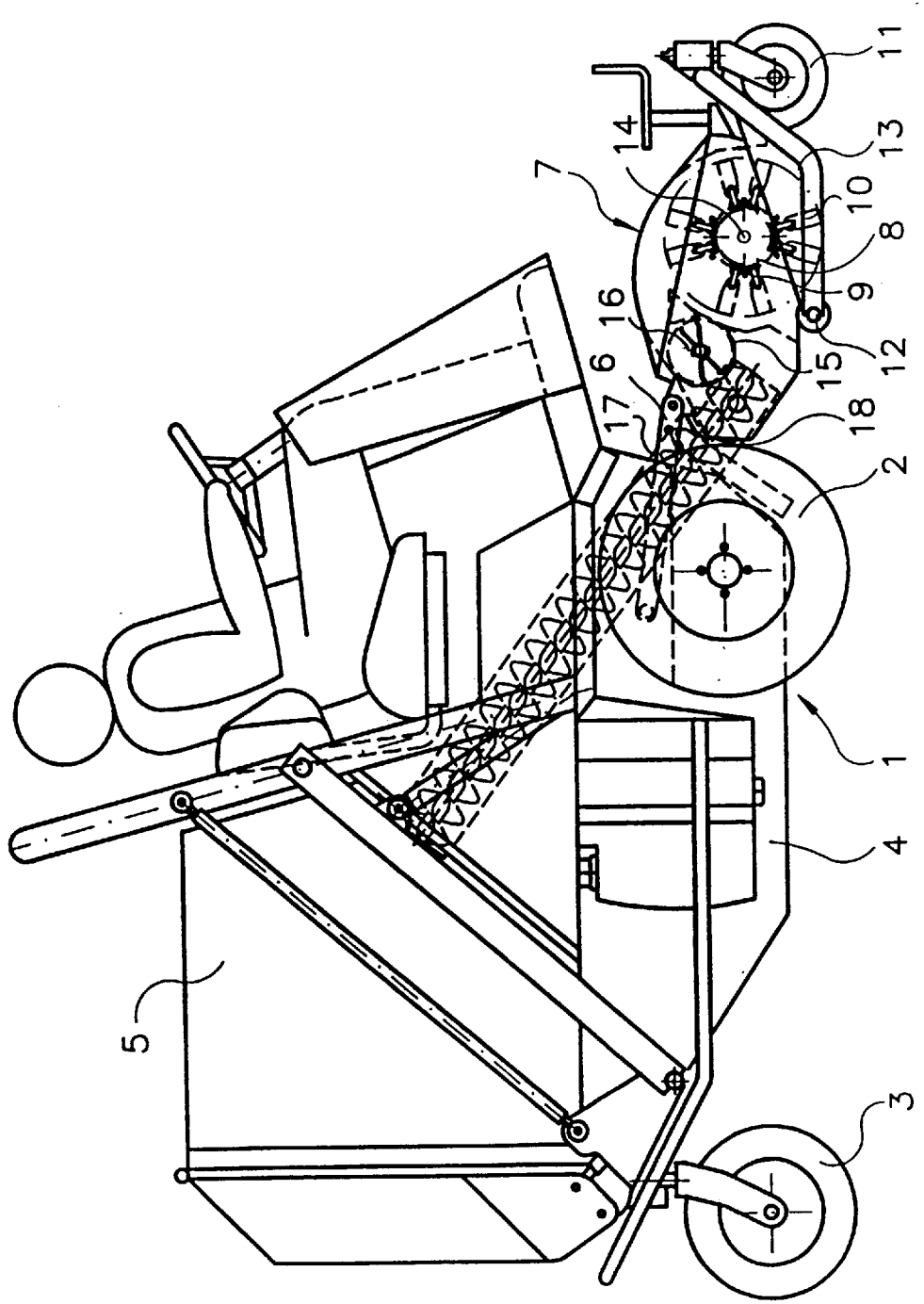
FIG. 1 is a schematic side elevational view of a mower and/or aerating machine.

According to the present invention, there is provided for a mower and/or aerating device with a mower drum and/or aerating drum 8. The mower drum and/or aerating drum 8 rotates around a horizontal axis disposed perpendicular to the vehicle advance direction. The mower drum and/or aerating drum 8 feeds material cut and/or removed from the ground to a transverse transport worm 16, rotating around a rotation axis 24 running parallel to the mower drum 8 and/or aerating drum and disposed in a transport trough 15, and a longitudinal transport worm 17 disposed with its lower end below a center region of the transverse transport worm 16 with an angle of 90° disposed between a longitudinal transport worm axis and a transverse transport worm axis. A transfer element 21 is disposed at the transport trough 15 and separates the mower drum 8 and/or aerating drum and the transverse transport worm 16. The transfer element 21 is disposed such that the material is thrown by the mower drum 8 at least nearly completely into the transport trough 15.

The transfer element 21 can be formed by a transfer plate 21.

The transfer element 21 can exhibit a larger width in its center region 28 as compared to its outer sides 29.

The transfer element 21 can exhibit its largest width at a location corresponding to a transfer region from the transverse transport worm 16 to the longitudinal transport worm 17.

The transfer element 21 can extend in a direction of the mower drum and/or the aerating drum 8 and can slope upwardly above the mower drum and/or aerating drum 8.

An intermediate disposed space 26 between an upper guide hood 27 and the transfer element 21 can be adjusted by shifting the transfer element 21.

A mower and/or aerating device includes a rotating drum, rotating around a horizontal axis disposed perpendicular to the vehicle advance direction. The rotating drum feeds material cut and/or removed from the ground to a transverse transport worm 16 rotating around a rotation axis 24 disposed parallel to an axis of the rotating drum. A transverse transport worm 16 is disposed in a transport trough 15. A longitudinal transport worm 17 adjoins below a center region of the transverse transport worm 16 at an angle of 90° relative to the transverse transport worm 16. The transverse transport worm 16 exhibits spirals 22 running from its outer edges in opposite direction toward its center. The ends 52, 54 of the spirals 22 are disposed in the center region of the transverse transport worm 16 and are staggered by 180° relative to each other. Delivery plates 20 are disposed at the end 52, 54 of each spiral 22. Said delivery plates 20 are extending at least nearly parallel to the rotation axis 24 of the transverse transport worm 16.

The delivery plates 20 can be disposed in a transfer region of the material from the transverse transport worm 16 to the longitudinal transport worm 17.

The delivery plates 20 can exhibit a height H in a region of the spiral 22. Said height H can correspond to a height H' of the spiral 22. The delivery plates 20 can be disposed at a downwardly sloping angle from the upper edge 23 of the spiral 22.

The mower and/or aerating machine is an apparatus for a variety of uses and can be employed in addition to the mowing of lawns also as an aerating and/or collecting machine. The machine shown in FIG. 1 exhibits a moving mechanism 1 with two driven front wheels 2 and a rear swivel wheel 3. The two driven front wheels 2 have a larger diameter as compared to the rear swivel wheel 3. The steering is performed by the driven front wheels 2 with a steering wheel turned by an operator.

The collection container 5 is disposed at the frame 4 of the machine and in particular on the back side of the machine. The mower and/or aerating device 7 is disposed upwardly and downwardly movable in a height level direction on the front side of the machine with the lower guide bars 6. The mower and/or aerating device 7 exhibits the rotatingly driven mower drum 8, where the mower blades or the aerating blades 10 are attached to the mower drum 8 with the supports 9. A rotating drum in the context of this description is a mower drum 8 and/or an aerating drum. The mower drum axis is disposed transverse relative to the advance moving direction of the mower machine. The front swivel wheels 11, through which the mowing level and/or the aerating depth can be adjusted in connection with the rear roller 12, are disposed on the front side of the mower and of the aerating device 7. Similarly, the rear roller 12 can also be adjusted in height level direction. The mower and/or aerating device 7 can be Lifted upwardly into a transport position through a lifting device 51 shown in FIG. 1.

The transverse transport worm 16 is disposed in a transport trough 15 located above the mower axis 14 of the mower drum 8 and located behind the trajectory circle 47 of the mower and aerating blade 10. The transport trough 15 is attached to the casing 13 of the mower and/or aerating device 7. The transverse transport worm 16 throws the material mowed by the mower blades and/or lifted by the aerating blades 10 into the transport groove of the transport trough 15 of the transverse transport worm 16. The transverse transport worm 16 feeds the material from the two outer end sides of the transport groove in the transport trough 15 to the center of the transport trough 15 and to the longitudinal transport worm 17. This longitudinal transport worm 17 (FIG. 1, 2) is disposed in a transport tube 18, where the transport tube 18 is rigidly attached to the casing 13 of the mower and/or aerating device 7. This transport tube 18 forms the further guide device for the mower and/or aerating device 7 for the deflection and guiding of the mower and/or aerating device 7 relative to the frame 4 of the machine. The material is transported with the longitudinal transport worm 17 into the collection container 5 and the material is compacted in the collection container 5.

Figure 2:
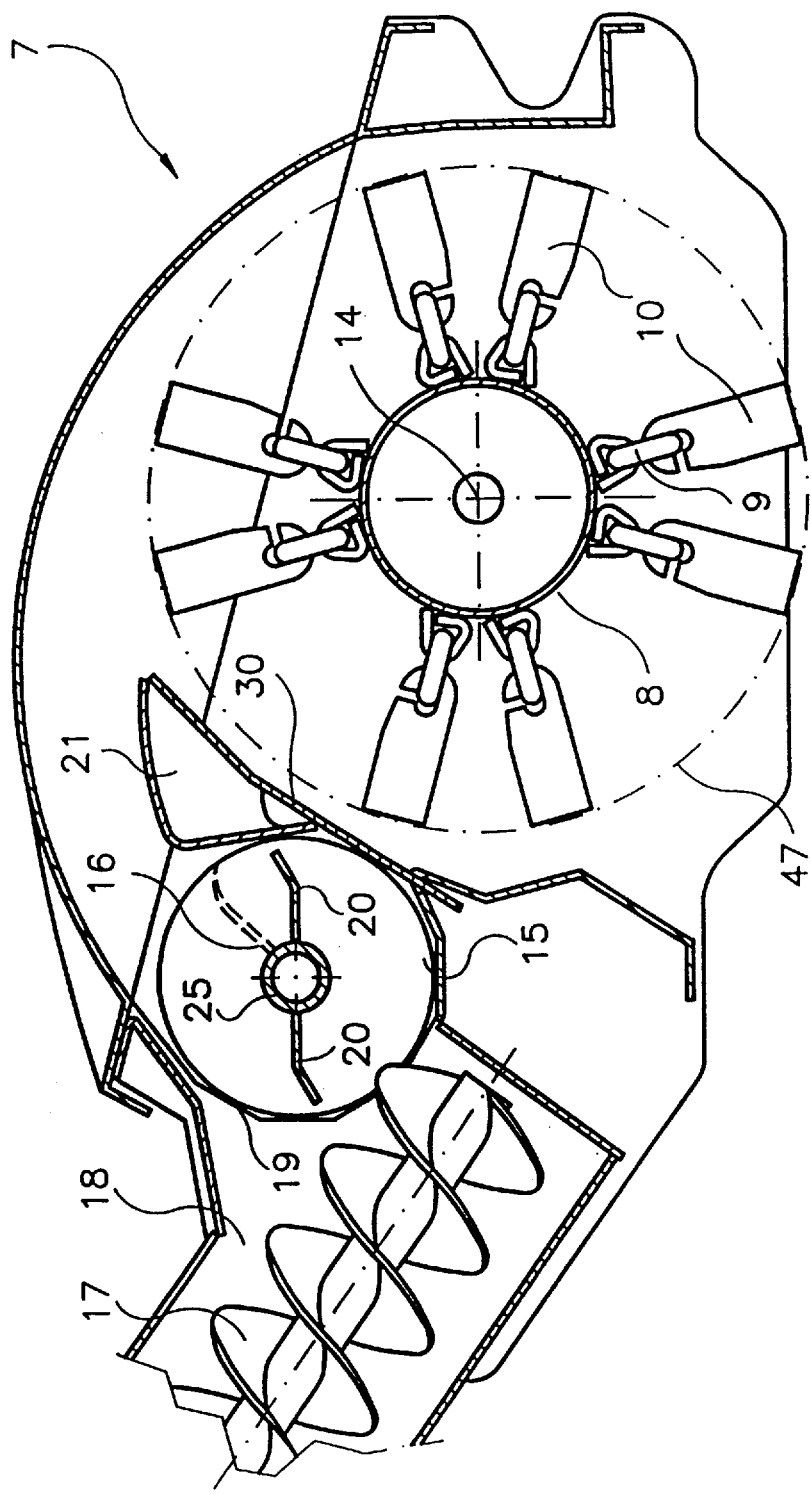
FIG. 2 is a schematic side elevational view showing the mower device of the mower and/or aerating machine of FIG. 1 at an enlarged scale.
Figure 7:
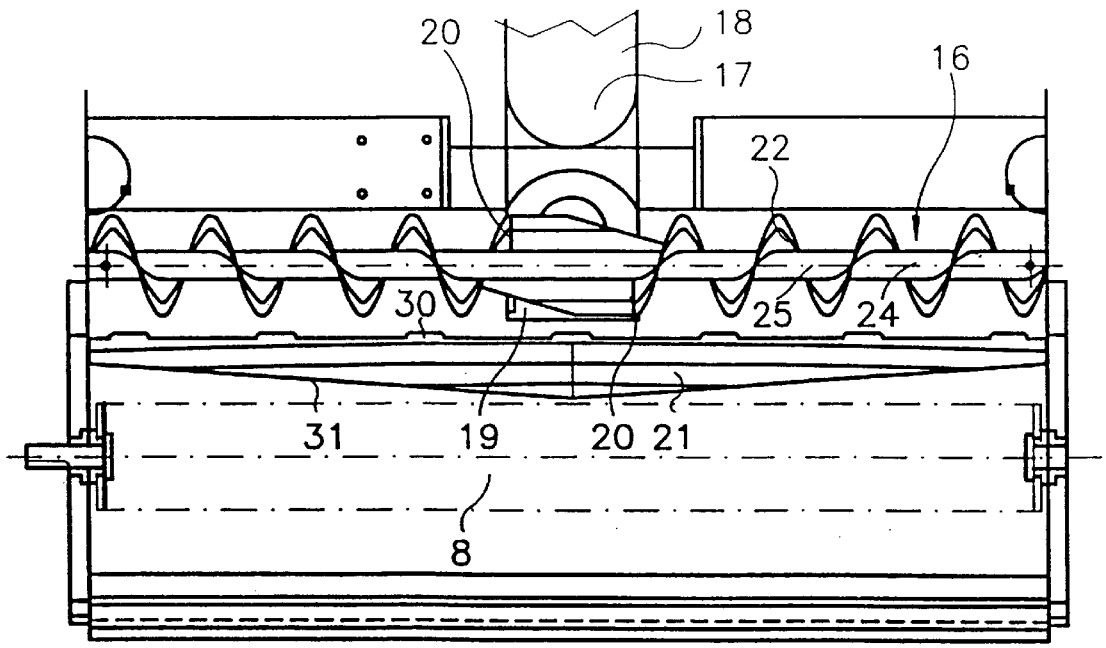
FIG. 7 is a schematic representation of the mower and/or aerating machine in a top planar view and at a different scale.

A transfer element, formed as a transfer plate 21, adjoins in an upper direction between the transverse transport worm 16 and the mower drum 8 for transferring material from the mower drum to the transport trough 15, as shown in FIGS. 2 and 3. The transfer plate 21 is attached at the transfer trough 15. The transfer plate 21 extends in the direction of the mower and/or aerating drum 8 and slopes upwardly above the mower drum and/or aerating drum 8. The transfer plate 21, shown in FIGS. 4–6, exhibits in its center 28 a larger width as compared to the width present at the outer sides 29. The width of the transfer plate 21 at the center can be from about 2 to 4 times the width at the outer sides 29. The rear side of the transfer plate 29 is generally straight and the front side of the transfer plate 29 protrudes at the center 28 and is connected by substantially straight lines to the outer sides 29. The transfer plate 21 exhibits its largest width in the transfer region of the mowing material from the transverse transport worm 16 to the longitudinal transport worm 17, where the transfer region is disposed in the center 28 of the transfer plate 21. The front edge 31 of the transfer plate 21 narrows from the center 28 toward outer sides 29 of the transfer plate 21 and extends in addition in a downward slope in the direction of the transverse transport worm 16. Thus, the front edge 31 of the transfer plate 21 is continuously pulled downwardly from a middle position to the sides. Based on its particular shape, the transfer plate 21 exhibits a substantial widening extending into the rotor space of the mower and/or aerating device 7 as shown in FIG. 7. The transfer plate 21 is broadest in the center 28 located at the transfer region from the transverse transport worm 16 to the longitudinal transport worm 17. A cross-section of the transfer plate 21 exhibits a shape of a cross-section of an angle bar although a bending line of the transfer plate 21 is rounded.

Figure 10:
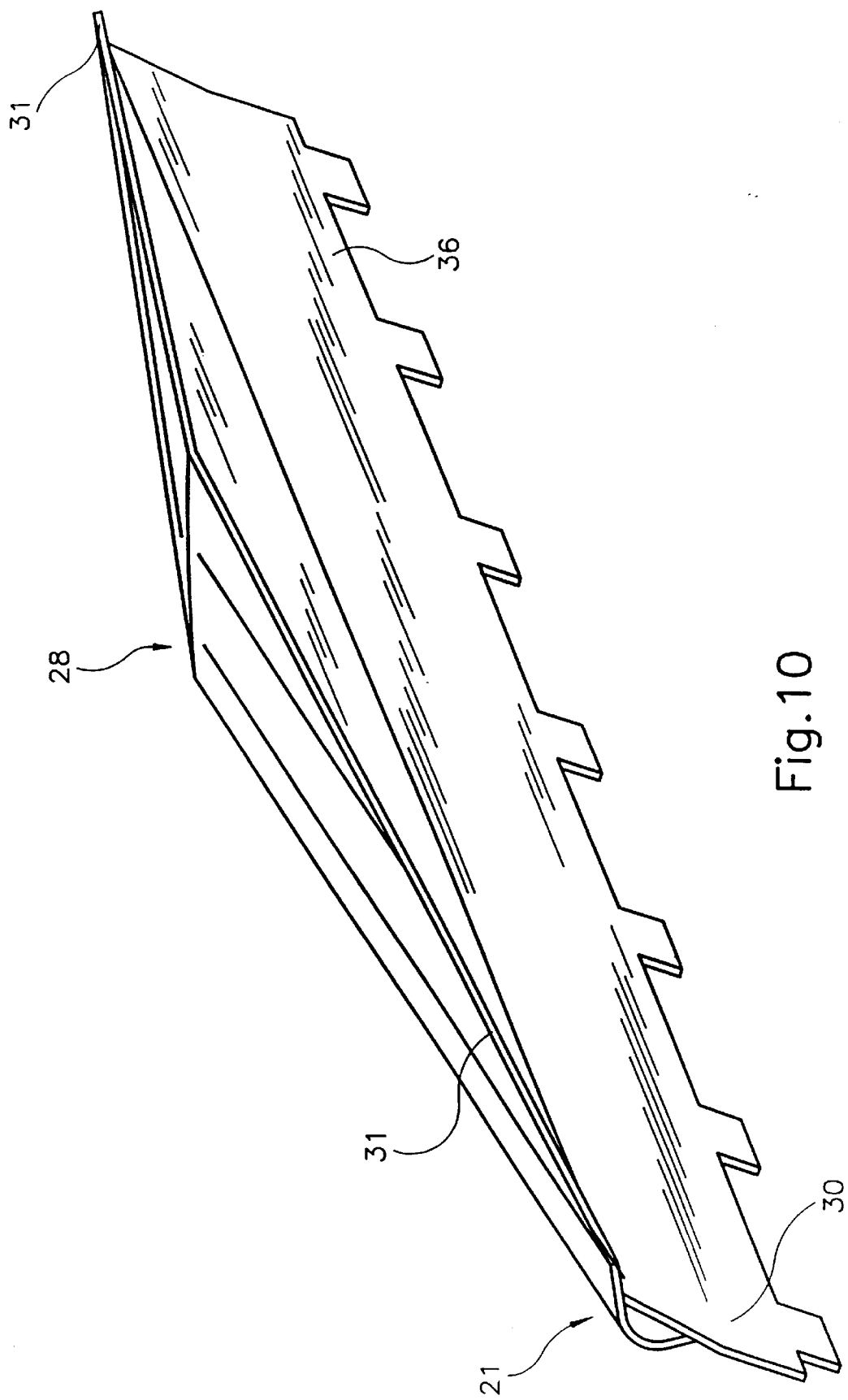
FIG. 10 is a perspective view of the transfer plate element.

The transfer plate 21, shown in FIG. 10, is reinforced by a front plate 30 to which the transfer plate 21 is attached by its longitudinal edges, said longitudinal edges extending substantially perpendicular relative to the mower advance direction. An upper edge of the transfer plate 21 is attached to an upper edge of the front plate 30 and forms together with the upper edge of the front plate 30 the front edge 31 (FIG. 10) of the transfer plate 21. The front plate 30 is broader than the transfer plate 21 and exhibits seven tongues 35 at its free longitudinal edge disposed relatively remote to the front edge 31. A cross-section of each of seven rectangular tongues 36 matches a guide rail at the transverse trough, where the tongues 36 are inserted. The guide rails are attached at the transport trough 15 and allow to stabilize the transfer plate 21.

The rear end of the transfer plate 21 is bent off downwardly, where the downward section forms a rear plate and then the lower end of the rear plate engages the front plate 30 in a position of about a middle third of the width of the front plate 30. The rear plate is positioned such that a radius perpendicular to the worm shaft 25 is disposed perpendicular to the rear plate at a position in the lower half of the rear plate. The front plate 30 is generally positioned such that a point within an inner third of the front plate 30 is disposed perpendicular to a radius extending from the mower axis.

Figure 11:
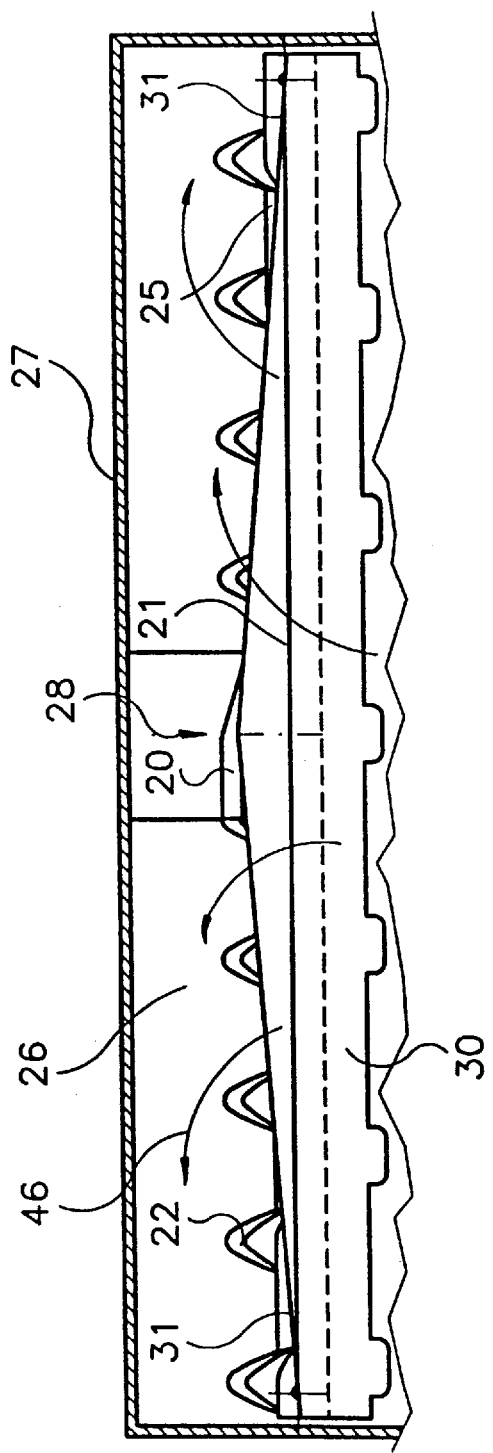
FIG. 11 is a schematic diagram illustrating the disposition of the transfer plate element in a view along line 11—11 of FIG. 3.

The transfer plate 21 can be disposed adjustable in such a way that the intermediate space 26 between the transfer plate 21 and the guide hood 27 is changeable and adjustable by shifting the transfer plate 21 in a substantially upward or, respectively, downward direction. The guide hood 27 furnishes a cover above the mower and/or aerating device 7. An alternate position 45 of the transfer plate 21 is indicated in FIG. 3 with dashed lines. The cross-section of the intermediate space made along the transfer plate 21 has the smallest free height in the center region and broadens to both outer sides as shown in FIG. 11. The view of the transfer plate 21 in FIG. 11 is substantially similar to the view of the transfer plate 21 in FIG. 4. This particular shape of the intermediate space 26 causes dividing an air stream 46, pushed up during rotation of the mower and/or aerating drum 8, substantially into two air streams directed to side regions of the transverse transport worm 16. Thereby, the mowed material is thrown in a relatively smaller quantity to the center of the transverse transport worm 16 as compared to the quantity of the mowed material thrown to the outer sides of the transfer transport worm 16. Also, in case of a low density of mowing material, there is achieved a sufficiently large separating path of the actual mowed material from the air stream accompanying the mowed material.

Further, the mowed material is directed in the region, where the longitudinal transport worm 17 and the transport tube 18 forming a worm conveyor are connecting, to the transport trough 15 as shown in FIGS. 1, 2 and 3. There is provided a passage opening 19 in the transport trough 15 in order that the material can be fed from the transverse transport worm 16 to the longitudinal transport worm 17.

Figure 8:
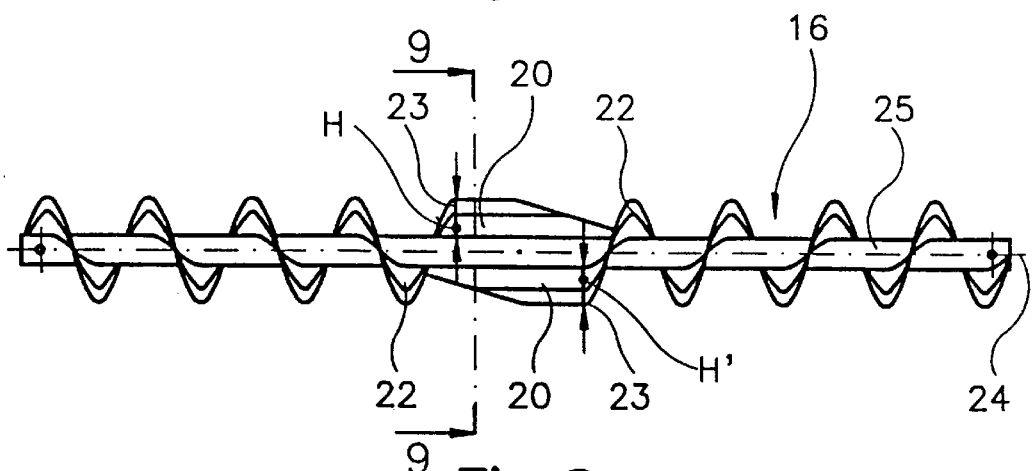
FIG. 8 is a top planar view onto the transverse transport worm at a different scale.
Figure 9:
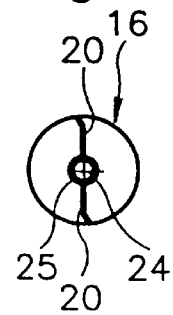
FIG. 9 is a schematic diagram illustrating the disposition of the delivery plates at the transverse transport worm in a view along section line 9—9 of FIG. 8.

In order to provide for a better transfer of the material from the transverse transport worm 16 to the longitudinal transport worm 17, delivery plates 20 are disposed in the transfer region of the material from the transverse transport worm 16 to the longitudinal transport worm 17. The delivery plates 20 are disposed staggered by 180° relative to each other as seen in FIGS. 7 and 8. For this purpose, the ends 52, 54 of the spirals 22 of the transverse transport worm 16 are disposed staggered by 180° relative to each other in the center area near the delivery plates 20 of the transverse transport worm 16. The delivery plates 20 are attached to a worm shaft 25 and disposed at the inner ends of the spirals 22 or volutions of the transverse transport worm 16. The delivery plates 20 exhibit a height H in the region adjoining to the spirals 22 or volutions, where the height H corresponds substantially to the height H' of the spiral 22 and preferably the height H of the delivery plates is from about 0.9 to 1.1 times the height H' of the spiral 22. The delivery plates 20 extend from the upper edge 23 of the spiral 22 and slope downwardly starting at a center of the transverse transport worm 16, in direction of the rotation axis 24 of the transverse transport worm 16 or, respectively, of the transport trough 15 or, respectively, the worm shaft 25. Each of the delivery plates 20 extends beyond the passage opening 19 and ends at a neighboring spiral of the transverse transport worm. The delivery plates 20 are bent forwardly toward a rotating direction of the transverse transport worm at their free edge running parallel to the worm shaft 25. A bending line of each delivery plate 25, separating a flat plate section from the bent edge, is disposed from about 0.1 to 0.3 times the height H from the free edge of said each delivery plate 25. This shape of the delivery plates 20 allows a better feeding of the mowed material from the transverse transport worm 16 to the longitudinal transport worm 17.

Thus, the transfer and collection quality, which was up to the present unsatisfactory in the side region, is substantially improved and optimized. According to the present invention, an element between the mower drum and/or aerating drum and the transverse transport worm during operation generates a stream of air for achieving a nearly completely throwing of mowed material into the transverse transport worm. A good transfer of the material from the transverse transport worm to the longitudinal transport worm is obtained based on this construction.

It will be understood that each of the elements, or two or more together, may find a useful application in other types of the mowers, differing from the types described above.

While the invention has been illustrated and described as embodied in the context of a mower and/or aerating device, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A mower and/or aerating device comprising
   a frame having a moving mechanism;
   a casing attached to a front of the frame;
   a rotating drum disposed in the casing and rotating around a horizontal axis;
   a transport trough disposed in the casing and attached to the frame;
   a transverse transport worm rotating around a rotation axis running parallel to the rotation axis of the rotating drum and disposed in the transport trough;
   a transfer element disposed at the transport trough for separating the rotating drum and the transverse transport worm, wherein the transfer element is disposed such that material cut and/or removed from ground, delivered by the rotating drum, is thrown from the rotating drum substantially into the transport trough, wherein the transfer element assures that the speed of the material blown by the mower remains substantially constant until the transport trough is reached;
   a longitudinal transport worm following the transverse transport worm and disposed below a center region of the transverse transport worm with an angle of 90° between an axis of the longitudinal transport worm and the rotation axis of the transverse transport worm.

2. The mower and/or aerating device according to claim 1, wherein
   the transfer element is formed by a plate.

3. The mower and/or aerating device according to claim 1, wherein
   the transfer element exhibits a larger width in a center region as compared to outer sides of the transfer element, wherein the width is measured along a mower and/or aerating device advance direction.

4. The mower and/or aerating device according to claim 1, wherein
the transfer element extends in direction of the rotating drum and extends at an inclined angle upwardly above the rotating drum.

5. The mower and/or aerating device according to claim 1, further comprising
an upper guide hood disposed above the transverse transport worm and the rotating drum, wherein an intermediate space between the transfer element and the upper guide hood is adjustable by shifting the transfer element.

6. The mower and/or aerating device according to claim 1, wherein
the transverse transport worm exhibits spirals running from outer sides of the transverse transport worm in opposite direction toward the center region of the transverse transport worm, wherein ends of the spirals disposed in the center region of the transverse transport worm are staggered by 180° relative to each other, wherein each end of the spirals disposed in the center region is attached to a delivery plate disposed in a plane containing the rotation axis of the transverse transport worm, wherein said delivery plates are disposed in a transfer region of the cut and/or from ground removed material from the transverse transport worm to the longitudinal transport worm.

7. The mower and/or aerating device according to claim 6, wherein
each delivery plate exhibits a height H in a region, where each said delivery plate is attached to said ends of the spirals disposed in the center region, and wherein the height H corresponds to a height H' of said spirals, and wherein said each delivery plate is disposed sloped downwardly at an angle from an upper edge of said spirals.

8. The mower and/or aerating device according to claim 6, wherein
said each delivery plate is bent at a free edge running parallel to the axis of the transverse transport worm in a rotating direction of the transverse transport worm.

9. The mower and/or aerating device according to claim 1, wherein the transfer element extends in an upright direction.

10. The mower and/or aerating device according to claim 1, wherein the transfer element assures a transfer of the material from the mower drum to the transverse transport worm.

11. The mower and/or aerating device according to claim 1, wherein the transfer element is disposed opposite to the guide hood to form a channel for the material thrown by the mower drum.

12. The mower and/or aerating device according to claim 1, wherein the transfer element is disposed such that the material will fall substantially onto the top of the transport trough.

13. The mower and/or aerating device according to claim 1, wherein the transfer element extends in an upright direction,
wherein the transfer element assures a transfer of the material from the mower drum to the transverse transport worm,
wherein the transfer element is disposed opposite to the guide hood to form a channel for the material thrown by the mower drum, and
wherein the transfer element is disposed such that the material will fall substantially onto the top of the transport trough.

14. A mower and/or aerating device with a mower drum and/or aerating drum (8) rotating around a horizontal axis disposed perpendicular to the vehicle advance direction, where the mower drum and/or aerating drum (8) feeds material cut and/or removed from the ground to a transverse transport worm (16), rotating around a rotation axis (24) running parallel to the mower drum (8) and/or aerating drum and disposed in a transport trough (15), and a longitudinal transport worm (17) disposed with its lower end below a center region of the transverse transport worm (16) with an angle of 90° disposed between a longitudinal transport worm axis and the rotation axis (24) of the transverse transport worm (16), wherein
a transfer element (21) is disposed at the transport trough (15) and separates the mower drum (8) and/or aerating drum and the transverse transport worm (16), wherein the transfer element (21) is disposed such that the material is thrown by the mower drum (8) into the transport trough (15), and wherein the transfer element (21) exhibits its largest width at a location corresponding to a transfer region from the transverse transport worm (16) to the longitudinal transport worm (17), wherein the transfer element assures that the speed of the material blown by the mower remains substantially constant until the transport trough (15) is reached.

15. The mower and/or aerating device according to claim 14, wherein the transfer element is disposed in spaced relation to the guide hood to form a channel for the material thrown by the mower drum (8) to the transfer transport worm.

16. A mower and/or aerating device comprising
a frame having a moving mechanism;
a casing attached to a front of the frame;
a rotating drum disposed in the casing and rotating around a horizontal axis;
a transport trough disposed in the casing and attached to the frame:
a transverse transport worm rotating around a rotation axis running parallel to the rotation axis of the rotating drum and disposed in the transport trough;
a transfer element disposed at the transport trough for separating the rotating drum and the transverse transport worm, wherein the transfer element is disposed such that material cut and/or removed from ground, delivered by the rotating drum, is thrown from the rotating drum into the transport trough;
a longitudinal transport worm following the transverse transport worm and disposed below a center region of the transverse transport worm with an angle of 90° between an axis of the longitudinal transport worm and the rotation axis of the transverse transport worm, wherein the transfer element exhibits a largest height in a transfer region from the transverse transport worm to the longitudinal transport worm for the material cut and/or removed from the ground.

17. A mower and/or aerating device with a rotating drum, rotating around a horizontal axis disposed perpendicular to the vehicle advance direction, wherein the rotating drum feeds material cut and/or removed from the ground to a transverse transport worm (16) rotating around a rotation axis (24) disposed parallel to an axis of the rotating drum, wherein said transverse transport worm (16) is disposed in a transport trough (15), and where a longitudinal transport worm (17) adjoins below a center region of the transverse transport worm (16) at an angle of 90° relative to the transverse transport worm (16), wherein the transverse transport worm (16) exhibits spirals (22) running from its outer edges in opposite direction toward its center, wherein the ends (52, 54) of the spirals (22) are disposed in the center region of the transverse transport worm (16) and are staggered by 180° relative to each other, wherein delivery plates (20) are disposed at the end (52, 54) of each spiral (22), which delivery plates (20) are extending at least nearly parallel to the rotation axis (24) of the transverse transport worm (16).

18. A mower and/or aerating device according to claim 17, wherein the delivery plates (20) are disposed in a transfer region of the material from the transverse transport worm (16) to the longitudinal transport worm (17).

19. A mower and/or aerating device according to claim 17, wherein the delivery plates (20) exhibit a height H in a region of the spiral (22), which height H corresponds to a height H' of the spiral (22), and where the delivery plates (20) are disposed at a downwardly sloping angle from the upper edge (23) of the spiral (22).

20. A mower and/or aerating device with a mower drum and/or aerating drum (8) rotating around a horizontal axis disposed perpendicular to the vehicle advance direction, where the mower drum and/or aerating drum (8) feeds material cut and/or removed from the ground to a transverse transport worm (16), rotating around a rotation axis (24) running parallel to the mower drum (8) and/or aerating drum and disposed in a transport trough (15), and a longitudinal transport worm (17) disposed with its lower end below a center region of the transverse transport worm (16) with an angle of 90° disposed between a longitudinal transport worm axis and the rotation axis (24) of the transverse transport worm (16), wherein a transfer element (21) is disposed at the transport trough (15) and separates the mower drum (8) and/or aerating drum and the transverse transport worm (16), wherein the transfer element (21) is disposed such that the material is thrown by the mower drum (8) into the transport trough (15).

21. A mower and/or aerating device according to claim 20, wherein the transfer element (21) is formed by a transfer plate (21).

22. A mower and/or aerating device according to claim 20, wherein the transfer element (21) exhibits a larger width in its center region (28) as compared to its outer sides (29).

23. A mower and/or aerating device according to claim 20, wherein the transfer element (21) extends in a direction of the mower drum and/or the aerating drum (8) and slopes upwardly above the mower drum and/or aerating drum (8).

24. A mower and/or aerating device according to claim 20, wherein an intermediate disposed space (26) between an upper guide hood (27) and the transfer element (21) is adjustable by shifting the transfer element (21).

25. The mower and/or aerating device according to claim 20, wherein the transfer element (21) extends in an upright direction.

26. The mower and/or aerating device according to claim 20, wherein the transfer element (21) assures a transfer of the material from the mower drum (8) to the transverse transport worm (16).

27. The mower and/or aerating device according to claim 20, wherein the transfer element assures that the speed of the fluid blown by the mower remains substantially constant until the transport trough (15) is reached.

28. The mower and/or aerating device according to claim 20, wherein the transfer element is disposed such that the material will fall substantially onto the top of the transport trough (15).

29. A mower and/or aerating device comprising a frame having a moving mechanism;

a casing attached to a front of the frame;

a rotating drum disposed in the casing and rotating around a horizontal axis;

a transport trough disposed in the casing and attached to the frame;

a transverse transport worm rotating around a rotation axis running parallel to the rotation axis of the rotating drum and disposed in the transport trough;

a transfer element disposed at the transport trough for separating the rotating drum and the transverse transport worm, wherein the transfer element is disposed such that material cut and/or removed from ground, delivered by the rotating drum, is thrown from the rotating drum into the transport trough;

a longitudinal transport worm following the transverse transport worm and disposed below a center region of the transverse transport worm with an angle of 90° between an axis of the longitudinal transport worm and the rotation axis of the transverse transport worm, wherein the transfer element is made of a rectangular plate bent along a center axis of the rectangular plate at an angle of 90°, wherein the rectangular plate is attached to a front plate exhibiting at a free edge rectangular tongues matching guide rails furnished in the transport trough, and wherein the front plate stabilizes the transfer element.

* * * * *